United States Patent [19]

Takahashi

[11] Patent Number: 5,291,358
[45] Date of Patent: Mar. 1, 1994

[54] MAGNETIC RECORDING DEVICE
[75] Inventor: Keiji Takahashi, Hanamaki, Japan
[73] Assignee: Matsushita Electric Industrial Co., Ltd., Osaka, Japan
[21] Appl. No.: 11,822
[22] Filed: Jan. 29, 1993

Related U.S. Application Data

[63] Continuation of Ser. No. 666,516, Mar. 11, 1991, abandoned.

[30] Foreign Application Priority Data

Mar. 16, 1990 [JP] Japan .................... 2-067739

[51] Int. Cl.⁵ .............................. G11B 17/02
[52] U.S. Cl. ................................ 360/99.08
[58] Field of Search ............. 360/99.04, 99.08, 98.07

[56] References Cited
U.S. PATENT DOCUMENTS

| | | | |
|---|---|---|---|
| 4,656,545 | 4/1987 | Kakuta | 360/98.07 |
| 4,658,312 | 4/1987 | Elsasser et al. | 360/99.08 |
| 4,803,576 | 2/1989 | Ohkita et al. | 360/99.08 |
| 4,961,122 | 10/1990 | Sakai et al. | 360/107 |
| 4,972,283 | 11/1990 | Kim | 360/130.24 |
| 5,142,173 | 8/1992 | Konno et al. | 360/98.07 |
| 5,210,665 | 5/1993 | Nishizawa | 360/99.08 |

Primary Examiner—Robert S. Tupper
Attorney, Agent, or Firm—Stevens, Davis, Miller & Mosher

[57] ABSTRACT

A magnetic recording device comprises, spindle means for supporting a magnetic record disk thereon, the spindle means rotated to rotate the magnetic record disk thereon, bearing means for supporting rotatably the spindle means to rotate the magnetic record disk, the bearing means including a radial bearing portion for supporting the spindle means in a radial direction of the spindle and an axial bearing portion for supporting the spindle means in a longitudinal direction of the spindle at a longitudinal end of the spindle means, and magnetic head means for magnetizing or demagnetizing portions of the magnetic record disk so that the informations is output from the magnetic record disk or is input thereinto, the magnetic head means moving on the magnetic record disk in the radial direction of the spindle means so that a wide radial surface of the magnetic record disk is used for recording the informations.

8 Claims, 6 Drawing Sheets

LONGITUDINAL DIRECTION

RADIAL DIRECTION

MAGNETIC RECORDING DEVICE

This application is a continuation of U.S. application Ser. No. 07/666,516, filed Mar. 11, 1991 (now abandoned).

BACKGROUND OF THE INVENTION AND RELATED ART STATEMENT

The present invention relates to a magnetic recording device used as an external storage of a computer system.

In a conventional magnetic recording device as shown in FIGS. 4, 5 and 6, a base 101 includes a bottom plate 102 at a first side and a bottom plate 103 at a second side opposite to the first side. The bottom plate 102 is arranged at a slightly lower level than a level of the bottom plate 103. A base plate 104 made of a thin iron plate is arranged on the bottom plate 102. A resin layer (not shown) is arranged on the base plate 104 so that a circuit is printed on the resin layer and a circuit part 105 for driving a motor is arranged thereon. A printed board 106 for processing signals is arranged on a lower side of the bottom plate 103 so that a circuit part 107 for processing signals is mounted on the printed board 106. The circuits on the base plate 104 and the printed board 106 are connected to each other through a flexible printed board 108 extending over a staircase-shaped portion between the bottom plates 102 and 103. A spindle motor 109 is supported on the base plate 104. The base plate 104 supports a head supporting device 114 including a carriage 110 and a head arm 111 to hold a magnetic head 112 for a side 0 of a floppy disk and a magnetic head 113 for a side 1 of the floppy disk, a head positioning device 117 including a stepping motor 115 and a lead screw 116, and a disk loading device 122 including a driving member 118, a cartridge holder 119, a trigger lever 120 for operating also to open a shutter, and an inject lever 121.

As shown in FIG. 6, in the spindle motor 109, a housing 123 extends integrally from the bottom plate 102 of the base 101 to receive a ball bearing 124 for bearing an axial or thrust force and a radial force of the spindle 126 and an oleophilic-metal bearing 125 for bearing the radial force of the spindle 126 so that a spindle 126 is supported rotatably by the bearings on the base 101. A stator 127 is fixed to an outer periphery of the housing 123, and winding coils 128 are mounted along a circular line on the stator 127 with a substantially constant distance. A rotor 130 is fixed to a forward end of the spindle 126 through a bushing 129, and magnets 131 for generating magnetic flux between the magnets 131 and the stator 127 magnetized by the winding coils 128 are mounted on an inner surface of an outer peripheral portion of the rotor 130, so that the spindle 126, the rotor 130 and the magnets 131 are rotated for rotating the floppy disk in accordance with changes in magnetized portions of the stator 127 by the winding coils 128.

In the conventional spindle motor described above, an actual inclination of an longitudinal axis of the spindle 126 in relation to a desired rotational axis thereof is large when the spindle 126 is rotated on its rotational axis and a centrifugal force by unbalance of the rotor 130 and of the magnets 131 around the rotational axis and a magnetic force between the stator 130 and the magnets 131 are applied to the spindle 126. Alternatively, in order to make the inclination of the spindle 126 small, sizes and shapes of the spindle 126, the bearings 124 and 125 and an hole of the housing 123 must be very accurate and a distance between the bearings 124 and 125 must be large.

OBJECT AND SUMMARY OF THE INVENTION

An object of the present invention is to provide a magnetic recording device in which the inclination of the spindle for supporting the record disk in relation to the desired rotational axis thereof is small during rotation of the spindle.

According to the present invention, a magnetic recording device comprises, spindle means for supporting a magnetic record disk thereon, the spindle means rotating to rotate the magnetic record disk thereon, bearing means for supporting rotatably the spindle means to rotate the magnetic record disk, the bearing means including a radial bearing portion for supporting the spindle means in a radial direction of the spindle and an axial bearing portion for supporting the spindle means in a longitudinal direction of the spindle at a longitudinal end of the spindle means, and magnetic head means for magnetizing or demagnetizing portions of the magnetic record disk so that the information, is output from the magnetic record disk or is input thereinto, the magnetic head means moving on the magnetic record disk in the radial direction of the spindle means so that a wide radial surface of the magnetic record disk is used for recording the informations.

In the magnetic recording device according to the present invention, since the longitudinal end of the spindle is supported in the longitudinal direction of the spindle by the axial bearing portion of the bearing means, a radial movement of the longitudinal end of the spindle is restrained or kept small. Therefore, the inclination of the spindle in relation to the desired rotational axis thereof is kept small during the rotation of the spindle.

DETAILED DESCRIPTION OF PREFERRED EMBODIMENTS

Figure 1:
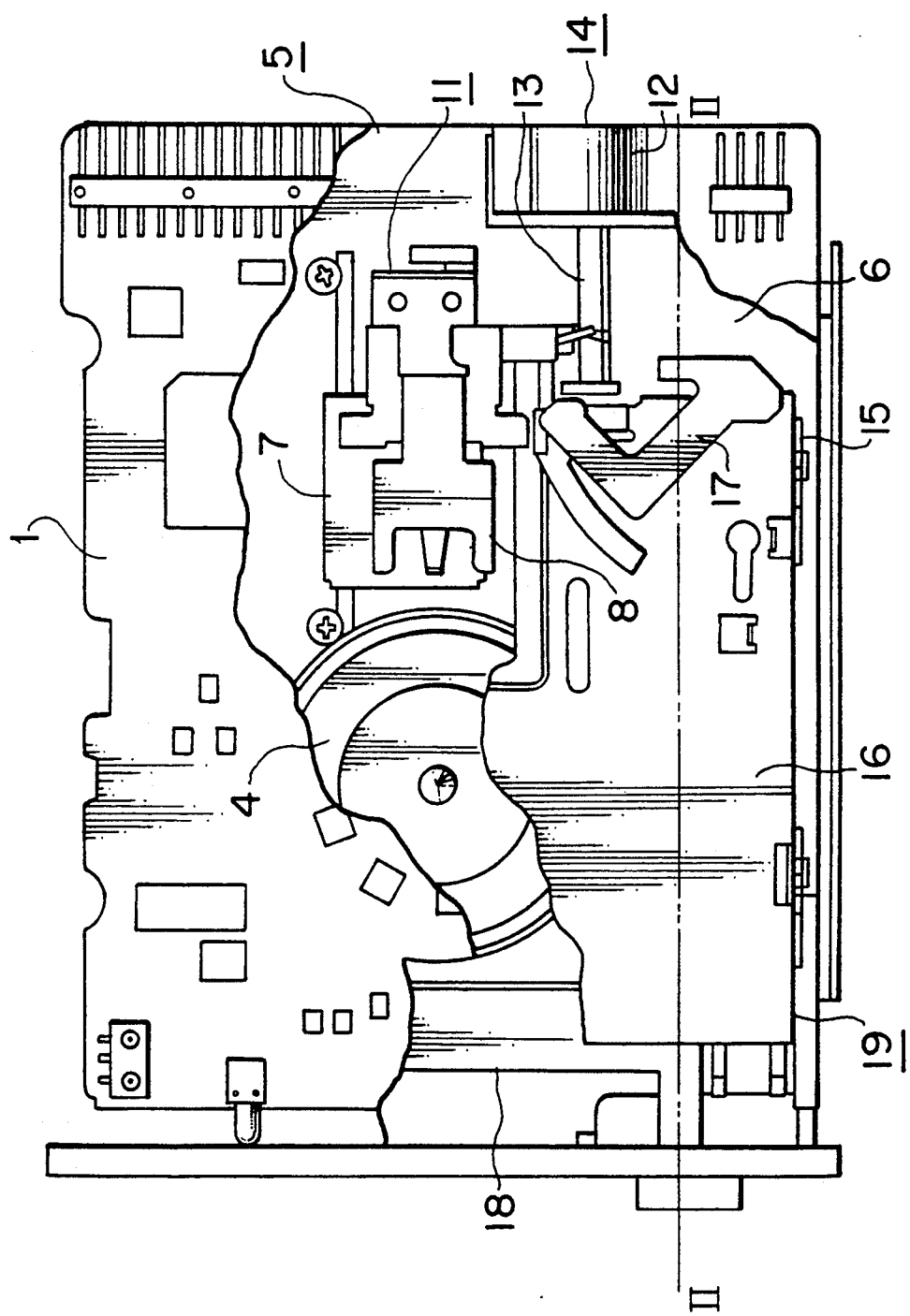
FIG. 1 is a plan view showing an arrangement in a magnetic recording device according to the present invention, in which view an upper part of the magnetic recording device is partially taken away to show a lower arrangement thereof.
Figure 2:
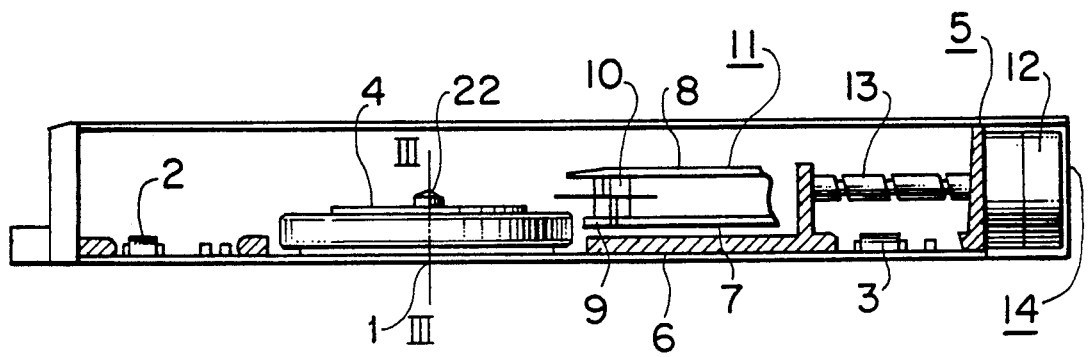
FIG. 2 is a cross-sectional view taken along a line II—II of FIG. 1.

In the device of FIGS. 1-2, connecting circuits (not shown) for driving a motor and for processing signals are printed on a resin layer (not shown) with which a thin iron base plate 1 is coated, and a circuit part 2 for driving the motor and a circuit part 3 for processing the signals are mounted on the connecting circuit to be connected to each other. A spindle motor 4 for supporting and rotating a magnetic record disk (not shown) thereon is supported on the base plate 1. A bottom plate 6 of a thick base body 5 made through a diecasting process is mounted on a part other than the connecting circuits and the spindle motor 4 on the resin layer of the base plate 1. A head supporting device 11 including a carriage 7 and a head arm 8 to guide, in a radial direction of the magnetic record disk, magnetic heads 9 and 10 each of which magnetizes or demagnetizes portions of a side 0 or 1 of the magnetic record disk, a head positioning device 14 including a stepping motor 12 and a lead screw 13 to drive the magnetic heads 9 and 10 on the head supporting device 11, and a disk loading device 19 including a driving device 15 for generating a power for driving the disk loading device 19, a cartridge holder 16 for holding a cartridge (not shown) receiving the magnetic record disk, a shutter opening lever for opening a shutter of the cartridge and an eject lever 18 for ejecting the cartridge from the cartridge holder 16 are mounted on the base body 5.

Figure 3:
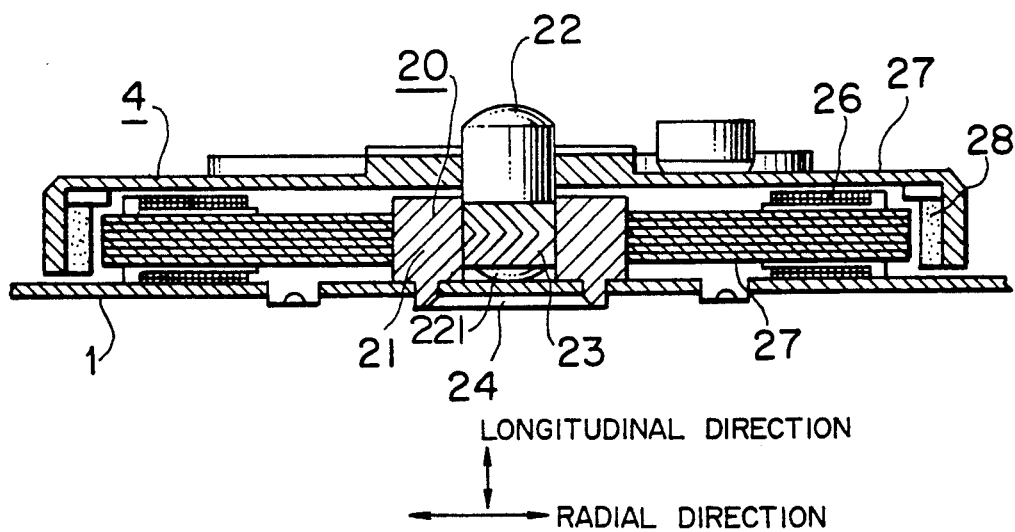
FIG. 3 is a cross-sectional view taken along a line III—III of FIG. 2 to show a structure of a spindle motor according to the present invention.
Figure 4:
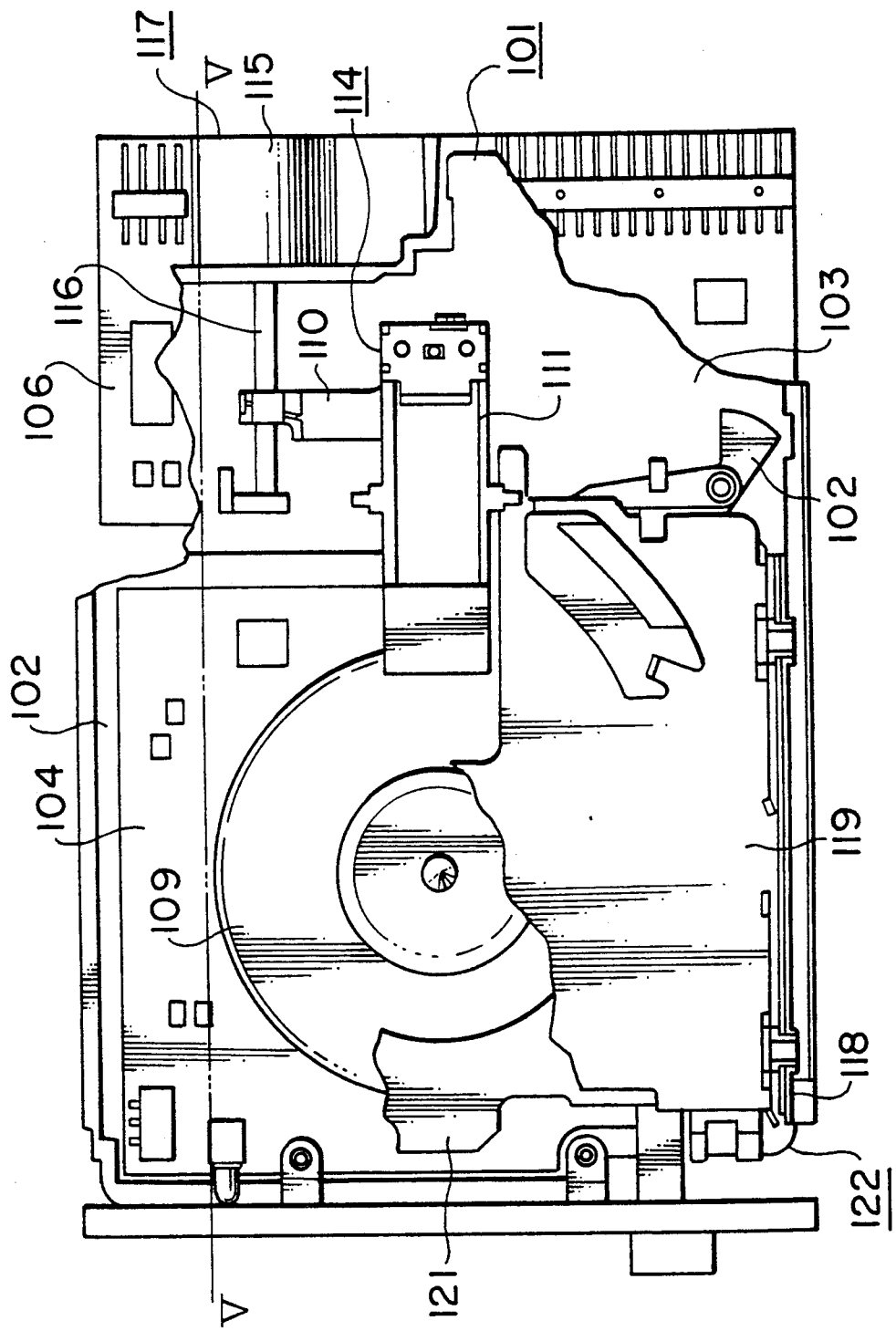
FIG. 4 is a plan view showing an arrangement in a conventional magnetic recording device, in which view an upper part of the magnetic recording device is partially taken away to show a lower arrangement thereof.
Figure 5:
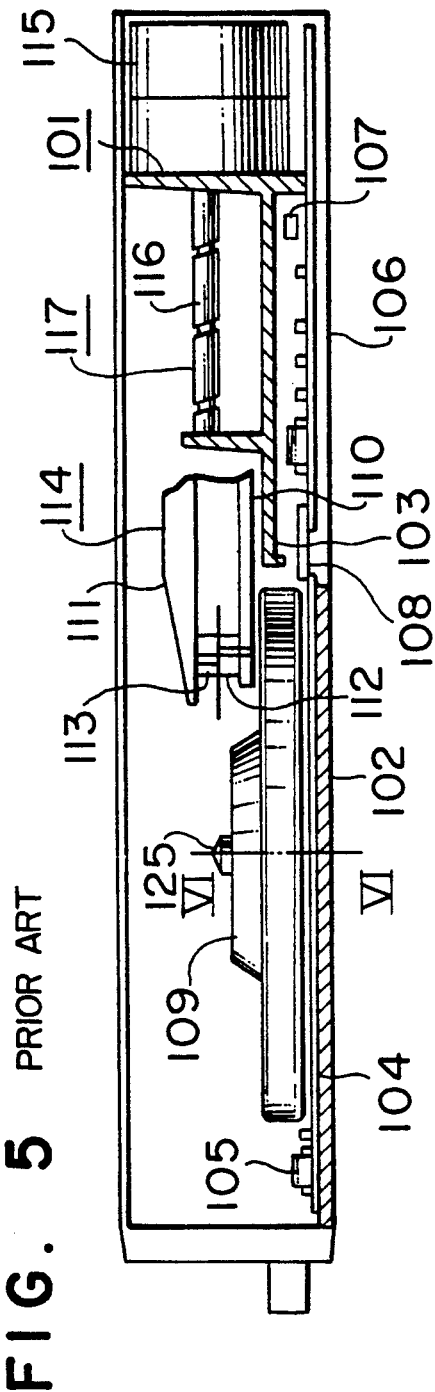
FIG. 5 is a cross-sectional view taken along a line V—V of FIG. 4.
Figure 6:
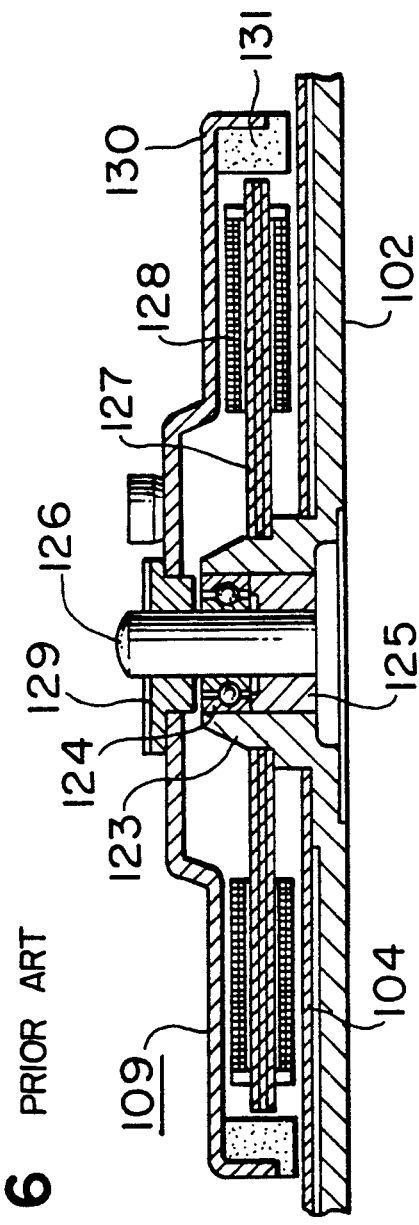
FIG. 6 is a cross-sectional view taken along a line VI—VI of FIG. 5 to show a structure of a conventional spindle motor.
Figure 7:
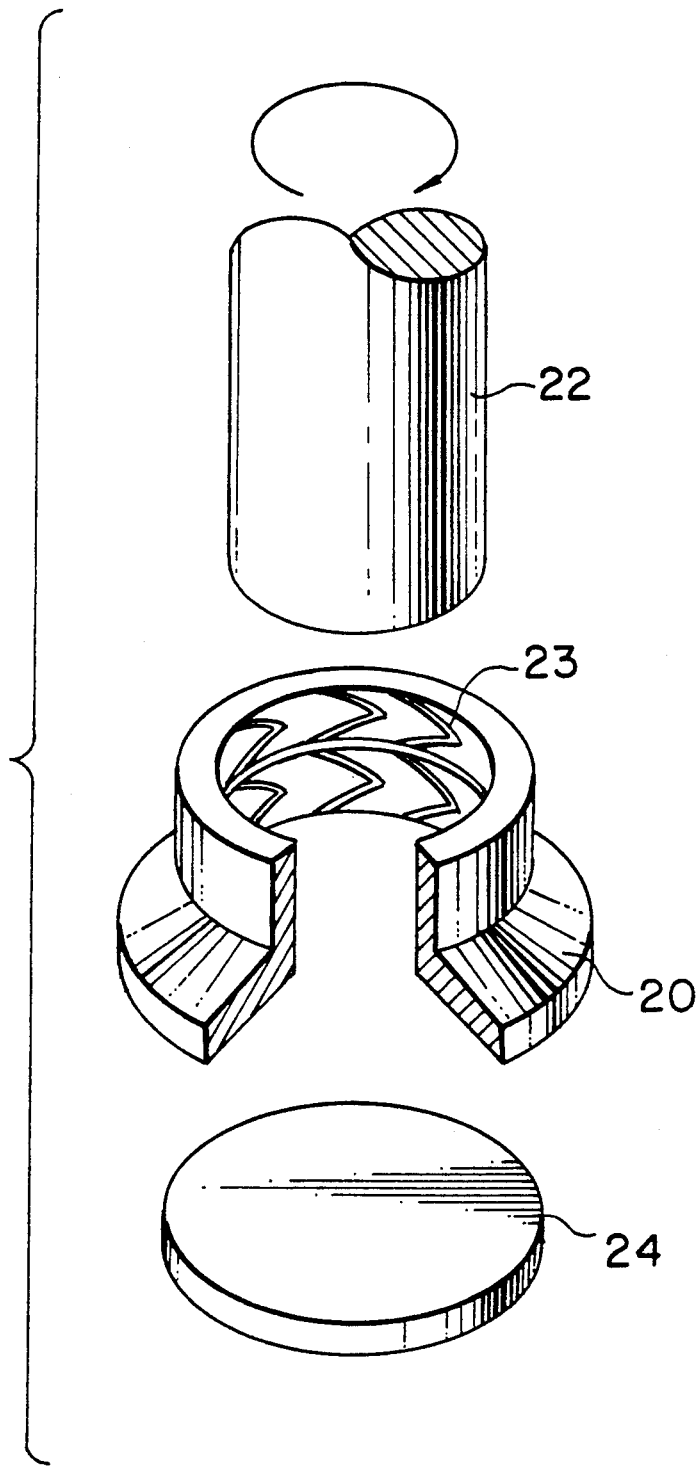
FIG. 7 is an oblique projection view showing helical grooves which may be used on a radial bearing member according to the present invention.

In the spindle motor 4, as shown in FIG. 3, a bearing 20 includes a radial bearing member 21 for supporting a spindle 22 in a radial direction of the spindle 22 and an axial bearing member 24 extending substantially perpendicularly to a longitudinal direction of the spindle 22 for supporting the spindle 22 in the longitudinal direction of the spindle 22 each of which is fixed to the base plate 1. A lubricant (not shown) for reducing friction may be applied to a space between the bearing 20 and the spindle 22, and the bearing 20 may be made of a hard ceramic or an oleophilic-metal or a low friction synthetic resin. A longitudinal end 221 of the spindle 22 which end contacts with the axial bearing member 24 may have a pointed (circular or conical) shape to concentrate a force applied to the spindle 22 in the longitudinal direction of the spindle 22 onto a contacting point between the longitudinal end 221 of the spindle 22 and the axial bearing member 24 and/or to form a space for receiving the lubricant between the bearing 20 and the longitudinal end 221 of the spindle 22. A longitudinal surface of the spindle 22 may have a plurality of helical grooves 23 as shown in FIG. 3. Alternatively, an inner surface of the radial bearing member 23 may have a plurality of helical grooves 23 as shown in FIG. 7. From FIGS. 3 and 7 it will be seen that the helical grooves are of at least two ends having different helical angles to form angles therebetween. FIG. 3 also illustrates an appropriate position for the vertices of the angles between the two kinds of helical grooves. These helical grooves 23 are effectual for forming securely an appropriate thickness of the lubricant over a space between the longitudinal surface of the spindle 22 and the radial bearing member 21. If the spindle motor 4 is not used in a direction shown in FIG. 3, that is, the above described longitudinal end 221 of the spindle 22 is arranged at an upper position and another longitudinal end of the spindle 22 opposite to the above described longitudinal end 221 of the spindle 22 is arranged at a lower position than the upper position, the another longitudinal end of the spindle 22 may be pressed toward the above described longitudinal end 221 of the spindle 22 by a spring device so that a contact between the above described longitudinal end 221 of the spindle 22 and the axial bearing member 24 is always kept securely.

Figure 9:
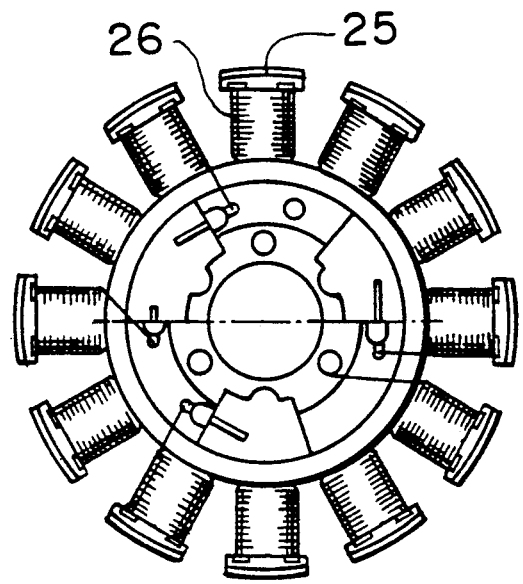
FIG. 9 is a plan view showing an arrangement of the stator.

A stator 25 as shown in FIG. 9 is fixed to an outer periphery of the radial bearing member 21 and includes winding coils 26. A rotor 27 is fixed to the another longitudinal end of the spindle 22 and includes magnets 28 at an inner surface of an outer periphery thereof to generate magnetic flux between the outer periphery of the rotor 27 and the stator 25. It will be immediately apparent that the configuration of the winding coils as shown in FIG. 9 necessarily produces a magnetic flux with a radial component. A height of a center of the magnets 28 is slightly different from that of the winding coils 26 in the longitudinal direction of the spindle 22 on the base plate 1, that is, a distance between the center of the magnets 28 and the longitudinal end 221 of the spindle 22 is slightly different from a distance between the center of the winding coils 26 and the longitudinal end 221 of the spindle 22 in the longitudinal direction of the spindle 22 so that a component in the longitudinal direction of the spindle 22 of a magnetic force generated between the stator 25 and the rotor 27 presses the spindle 22 against the axial bearing member 24. In case of that the motor 27 and the stator 25 are made of an electrically conductive material, the rotor 27 and the stator 25 electrically communicate with the base plate 1 when the axial bearing member 24 is made of an electrically conductive material, for example, a cement, alternatively, the rotor 27 and the stator 25 are electrically insulated from the base plate 1 when the axial bearing member 24 is made of an electrically insulating material, for example, an alumina.

Figure 8:
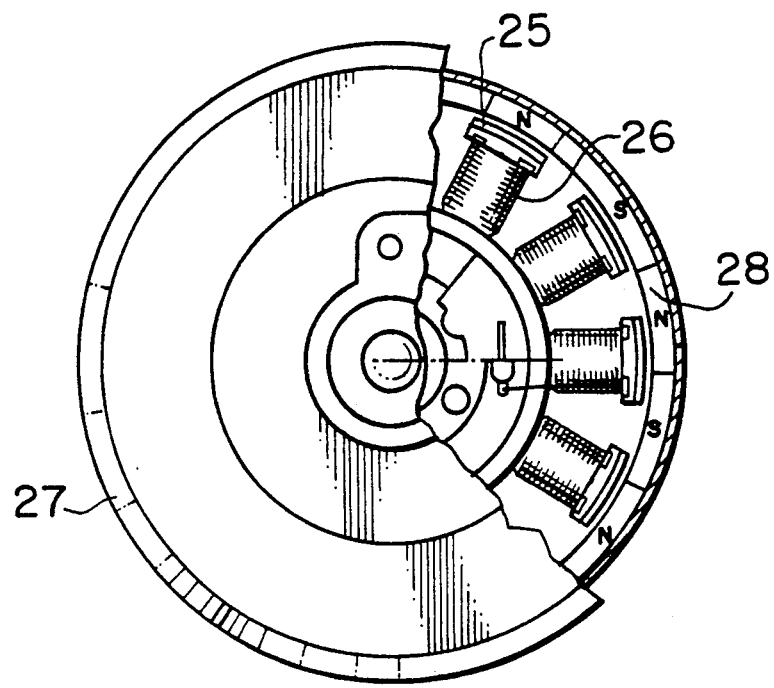
FIG. 8 is a plan view showing an arrangement of magnets fixed to a rotor and a stator with electromagnetic coils in a spindle motor used in the magnetic recording device, in which view an upper part of the spindle motor is partially taken away to show a lower arrangement thereof.

When magnetized portions or magnetic pole directions of the stator 25 as shown in FIGS. 3, 8 and 9 by the winding coils 26 to which an electric current is supplied are changed sequentially and in order along a circular line of the stator 25 by changing of energizing of the winding coils 26, the rotor 27 as shown in FIGS. 3 and 8 is rotated by the magnetic force generated between the stator 25 and the rotor 27 so that the spindle is rotated to rotate the magnetic record disk.

A Vickers hardness of the axial bearing member 24 is preferably more than 1200, a rate of a diameter of the spindle 22 to a length of the radial bearing member 21 in the longitudinal direction of the spindle is preferably 1:0.8 to 2, and a length of the spindle 22 is preferably less than 4 mm.

What is claimed is:

1. A magnetic recording device comprising:
   a spindle for supporting a magnetic record disk to rotate with the spindle, the spindle including a plurality of magnets which are arranged circumferentially around the spindle and which extend in a longitudinal direction of the spindle;
   a stator including a plurality of winding coils to generate a magnetic force between the stator and the spindle to rotate the spindle, the magnetic force having a radial component which extends in a radial direction of the spindle;
   magnetic head means for magnetizing or demagnetizing portions of the magnetic record disk so that information is output from the magnetic record disk or is input into the magnetic record disk, the magnetic head means moving on the magnetic record disk in the radial direction of the spindle so that a wide radial surface of the magnetic record disk is used for recording the information; and bearing means for rotatably supporting the spindle, the bearing means including a radial bearing portion for supporting the spindle in the radial direction of the spindle against the radial component of the magnetic force and n axial bearing portion for supporting the spindle in the longitudinal direction of the spindle;

wherein the magnetic recording device further comprises helical lubricant grooves for holding a lubricant, the helical lubricant grooves having first and second portions provided on at least one of the spindle and the radial bearing portion, the first and second portions of the helical lubricant grooves having different helical angles to form angles therebetween, and the angles having vertices arranged within a width of the magnets in the longitudinal direction of the spindle.

2. A magnetic recording device according to claim 1, wherein the vertices of the angles are arranged within the width of the magnets and within a width of the winding coils in the longitudinal direction of the spindle.

3. A magnetic recording device according to claim 1, wherein the vertices of the angles are arranged within the width of the magnets and within a width of inner diameters of the winding coils in the longitudinal direction of the spindle.

4. A magnetic recording device according to claim 1, wherein a position of the vertices of the angles in the longitudinal direction of the spindle is substantially equal to that of a center of the width of the magnets in the longitudinal direction of the spindle.

5. A magnetic recording device according to claim 1, wherein a position of the vertices of the angles in the longitudinal direction of the spindle is substantially equal to that of a center of a width of the winding coils in the longitudinal direction of the spindle.

6. A magnetic recording device according to claim 1, wherein a position of a center of a width of the winding coils in the longitudinal direction of the spindle is slightly different from that of a center of the width of the magnets in the longitudinal direction of the spindle so that an axial component of the magnetic force in the longitudinal direction of the spindle presses the spindle against the axial bearing portion.

7. A magnetic recording device according to claim 1, wherein the bearing means, the stator, and the magnetic head means are mounted on an integral iron base plate.

8. A magnetic recording device comprising:

a spindle for supporting a magnetic record disk to rotate with the spindle, the spindle including a plurality of magnets which are arranged circumferentially around the spindle and which extend in a longitudinal direction of the spindle;

a stator including a plurality of winding coils to generate a magnetic force between the stator and the spindle to rotate the spindle, the magnetic force having a radial component which extends in a radial direction of the spindle;

magnetic head means for magnetizing or demagnetizing portions of the magnetic record disk so that information is output from the magnetic record disk or is input into the magnetic record disk, the magnetic head means moving on the magnetic record disk in the radial direction of the spindle so that a wide radial surface of the magnetic record disk is used for recording the information; and bearing means for rotatably supporting the spindle, the bearing means including a radial bearing portion for supporting the spindle in the radial direction of the spindle against the radial component of the magnetic force and an axial bearing portion for supporting the spindle in the longitudinal direction of the spindle;

wherein at least one of the spindle and the radial bearing portion has first helical lubricant groove portions and second helical lubricant groove portions for holding a lubricant, the first groove portions and the second groove portions having different helical angles to form angles therebetween, and the angles having vertices arranged within a width of the magnets in the longitudinal direction of the spindle.

* * * * *